United States Patent
Jovanovic

(10) Patent No.: US 8,351,943 B2
(45) Date of Patent: Jan. 8, 2013

(54) METHOD AND APPARATUS FOR HANDOFF IN A WIRELESS NETWORK

(75) Inventor: Vladan Jovanovic, Leesburg, VA (US)

(73) Assignee: Alcatel Lucent, Paris (FR)

(*) Notice: Subject to any disclaimer, the term of this patent is extended or adjusted under 35 U.S.C. 154(b) by 1308 days.

(21) Appl. No.: 11/647,094

(22) Filed: Dec. 28, 2006

(65) Prior Publication Data

US 2008/0160998 A1 Jul. 3, 2008

(51) Int. Cl.
*H04W 36/00* (2009.01)

(52) U.S. Cl. .......................... 455/437; 370/331
(58) Field of Classification Search .............. 455/436
See application file for complete search history.

(56) References Cited

U.S. PATENT DOCUMENTS

| | | | |
|---|---|---|---|
| 5,646,632 A | 7/1997 | Khan et al. | |
| 5,940,762 A * | 8/1999 | Lee et al. | 455/442 |
| 6,192,246 B1 * | 2/2001 | Satarasinghe | 455/442 |
| 6,201,969 B1 | 3/2001 | Meier | |
| 6,360,098 B1 | 3/2002 | Ganesh et al. | |
| 6,430,414 B1 | 8/2002 | Sorokine et al. | |
| 7,006,828 B1 | 2/2006 | Czaja et al. | |
| 7,039,410 B2 * | 5/2006 | Jovanovic | 455/444 |
| 7,113,786 B2 * | 9/2006 | Proctor, Jr. | 455/442 |
| 7,376,425 B2 * | 5/2008 | Laroia et al. | 455/436 |
| 2004/0166887 A1 * | 8/2004 | Laroia et al. | 455/522 |
| 2006/0094431 A1 * | 5/2006 | Saifullah et al. | 455/436 |

* cited by examiner

*Primary Examiner* — Marcos Batista
(74) *Attorney, Agent, or Firm* — Harness, Dickey & Pierce, P.L.C.

(57) ABSTRACT

In response to a determination that a received pilot signal identification is not present in a current neighbor list of a mobile station, a network controller identifies one of a plurality of sectors associated with the missing pilot signal identification that is a most likely handoff candidate. In one embodiment, the most likely handoff candidate is determined as the sector that is closest to the mobile station. When the most likely candidate is identified, a handoff may be initiated between the mobile station and the identified sector. The handoff may be accomplished by activating a traffic channel for the mobile station in the identified sector.

15 Claims, 5 Drawing Sheets

| CELL | SECTOR | PN OFFSET | LATITUDE | LONGITUDE |
|---|---|---|---|---|
| C1 | 1 | 3 | Xxxxxxx1 | Yyyyyyy1 |
| C1 | 2 | 203 | Xxxxxxx1 | Yyyyyyy1 |
| C1 | 3 | 103 | Xxxxxxx1 | Yyyyyyy1 |
| C2 | 1 | 6 | Xxxxxxx2 | Yyyyyyy2 |
| C2 | 2 | 206 | Xxxxxxx2 | Yyyyyyy2 |
| C2 | 3 | 106 | Xxxxxxx2 | Yyyyyyy2 |
| C3 | 1 | 9 | Xxxxxxx3 | Yyyyyyy3 |
| C3 | 2 | 209 | Xxxxxxx3 | Yyyyyyy3 |
| C3 | 3 | 109 | Xxxxxxx3 | Yyyyyyy3 |
| C4 | 1 | 12 | Xxxxxxx4 | Yyyyyyy4 |
| C4 | 2 | 212 | Xxxxxxx4 | Yyyyyyy4 |
| C4 | 3 | 112 | Xxxxxxx4 | Yyyyyyy4 |
| C5 | 1 | 15 | Xxxxxxx5 | Yyyyyyy5 |
| C5 | 2 | 215 | Xxxxxxx5 | Yyyyyyy5 |
| C5 | 3 | 115 | Xxxxxxx5 | Yyyyyyy5 |
| C6 | 1 | 18 | Xxxxxxx6 | Yyyyyyy6 |
| C6 | 2 | 218 | Xxxxxxx6 | Yyyyyyy6 |
| C6 | 3 | 118 | Xxxxxxx6 | Yyyyyyy6 |
| C7 | 1 | 21 | Xxxxxxx7 | Yyyyyyy7 |
| C7 | 2 | 221 | Xxxxxxx7 | Yyyyyyy7 |
| C7 | 3 | 121 | Xxxxxxx7 | Yyyyyyy7 |
| C8 | 1 | 24 | Xxxxxxx8 | Yyyyyyy8 |
| C8 | 2 | 224 | Xxxxxxx8 | Yyyyyyy8 |
| C8 | 3 | 124 | Xxxxxxx8 | Yyyyyyy8 |
| ... | ... | ... | ... | ... |
| C103 | 1 | 21 | Xxxxxxx103 | Yyyyyyy103 |
| C103 | 2 | 221 | Xxxxxxx103 | Yyyyyyy103 |
| C103 | 3 | 121 | Xxxxxxx103 | Yyyyyyy103 |
| ... | ... | ... | ... | ... |
| C217 | 1 | 21 | Xxxxxxx217 | Yyyyyyy217 |
| C217 | 2 | 221 | Xxxxxxx217 | Yyyyyyy217 |
| C217 | 3 | 121 | Xxxxxxx217 | Yyyyyyy217 |
| ... | ... | ... | ... | ... |

*FIG. 5*

|  | LATITUDE | LONGITUDE | DISTANCE FROM MOBILE |
|---|---|---|---|
| MOBILE | Xxxxxxxx0 | Yyyyyyyy0 | N/A |
| CELL 7 / SECTOR 3 | Xxxxxxxx7 | Yyyyyyyy7 | 1.46 MILES |
| CELL 103 / SECTOR 3 | Xxxxxxxx103 | Yyyyyyyy103 | 7.53 MILES |
| CELL 217 / SECTOR 3 | Xxxxxxxx217 | Yyyyyyyy217 | 19.4 MILES |

METHOD AND APPARATUS FOR HANDOFF IN A WIRELESS NETWORK

BACKGROUND OF THE INVENTION

The present invention relates generally to wireless networks, and more particularly to handoff in wireless networks.

Code Division Multiple Access (CDMA) wireless networks are well known in the art for providing wireless voice and data services to mobile stations within the network's service area. CDMA is a spread spectrum technology, in that multiple users share the same broadband frequency range. Individual spreading codes, assigned to each of the multiple users, allows the signals for a particular user to be extracted from the transmitted signal. CDMA technology is well known in the art and will not be described in detail herein.

Mobile stations within a CDMA network communicate via base stations. Each base station serves a geographic area, often referred to as a cell. Each cell may be further divided into sectors, whereby each sector in a cell is served by one or more directional antennas associated with the base station serving the cell. Such a system is shown graphically in FIG. 1. FIG. 1 shows base station 102 with associated antenna system 104. The antenna system 104, as shown, contains three directional antennas 108, 110, 112, each serving sectors A, B, C of cell 106 respectively. One skilled in the art will recognize that while FIG. 1 shows one antenna serving each of the sectors, base station 102 may also contain multiple antennas for each sector.

Each sector of a cell in a CDMA wireless network is associated with a pilot signal. As will be described in further detail below, one of the uses of pilot signals is to facilitate handoff of the mobile station from one sector to another sector. The base stations of a CDMA network continuously transmit a pilot signal on each of its sectors. The pilot signals all have the same spreading code, but with a different code phase offset. This phase offset allows the pilot signals to be distinguished from one another. These phase offsets are referred to as PN offsets, and are generally in the range of 0 to 511. CDMA networks generally use a subset of the available offsets, usually in increments of 2, 3 or 4, for a total of 256, 170 or 128 unique PN offsets, respectively.

Most CDMA networks have at least several hundred 3-sector cells. Since each sector requires its own PN offset, the PN offsets in the network are not unique, and must be shared among the sectors in the network. In order to ensure unambiguous handoffs, PN offset reuse planning techniques are utilized to ensure that sectors having the same PN offsets are far enough apart so that PN offsets are locally unique. This ensures that a mobile station at any one location within the CDMA network is unlikely to detect the same PN offset from multiple sectors.

Mobile stations use the PN offsets for handoff as follows. Referring to FIG. 1, assume that mobile station 114 in sector A of cell 106 is being served by antenna 108, and is traveling in the direction of arrow 116, toward cell 124 with base station 120. As mobile station 114 gets closer to base station 120, it will detect the pilot signal being transmitted by base station 120 over antenna 122 in sector C of cell 124. More particularly, the mobile station 114 detects the pilot signal using a component generally referred to as a searcher. The searcher within a mobile station continuously checks for the appearance of new pilot signals and for the disappearance (or weakening) of previously detected pilot signals. When either of these events occurs, the mobile station transmits pilot signal information to the CDMA network. In particular, as shown in FIG. 1, the mobile station 114 will transmit this information to the network controller 126, which is responsible for mobility management within the network. In an IS-95/IS2000 compliant wireless network, these messages are called Pilot Measurement Strength Messages (PSMM). In 1xEV networks conforming to the IS-856 standard, these messages are called Route Update Messages (RUM).

In FIG. 1, as the mobile station 114 moves toward cell 124, the signal strength from the pilot signal being transmitted by antenna 122 in sector C of cell 124 will increase in strength. In response to a message with this information, the network controller 126 will allocate a new traffic channel in sector C of cell 124 (over antenna 122) so that the mobile station 114 may also communicate with base station 120 via this new traffic channel. As the signal strength from the pilot signal being transmitted by antenna 108 in sector A of cell 106 weakens, the network controller 126 will de-allocate the traffic channel in sector A of cell 106. This type of handoff is called a soft handoff, because the new traffic channel is allocated prior to de-allocation of the existing traffic channel. One skilled in the art will recognize that the particular steps and protocols for performing mobility management (e.g., handoffs) in a CDMA system are defined in the relevant network standards (e.g., IS-95/IS-2000, 1xEV/IS-857, etc.), and the handoff described herein is a generalized description.

In order to further facilitate handoff in CDMA systems, the network maintains neighbor lists associated with each of the sectors in the network. Each neighbor list contains an identification (i.e., PN offset) of the pilot signals in the neighboring sectors that mobile stations are likely to detect while communicating within a particular sector. For example, with reference to FIG. 1, the neighbor list for sector A in cell 106 would contain the PN offset of the pilot signal of sector C of cell 124 (transmitted by antenna 122) because a mobile station in sector A of cell 106 is likely to detect the pilot signal being transmitted in sector C of cell 124. The neighbor list also identifies the particular sector and cell associated with each of its identified pilot signals.

The neighbor lists associated with the serving sector(s) are also sent to the mobile stations after each handoff (and in certain cases after initial communication with the network) via a Neighbor List message. The mobile stations use the neighbor lists to focus the operation of the searcher element to search for the pilot signals of the most likely handoff candidate sectors.

Neighbor lists are generally populated and maintained by network operators. At the time of initialization of the network, the network operator manually populates the neighbor lists. This initial population of neighbor lists is complex. Each sector can generally detect one or two sectors from each of the closest four or five cells. Further, special RF propagation conditions (e.g., "ducting" along city streets with high-rise buildings and over-the-water propagation effects) may also require distant sectors to be included in the neighbor lists. Such propagation conditions are not always obvious to network planners. Further, extensive drive testing is usually needed for proper initial population of neighbor lists. Such drive testing is difficult, time consuming, and prone to human errors. Further, the constant evolution (e.g., adding, removing and changing equipment) of CDMA networks adds to the complications involved in maintaining up-to-date neighbor lists. In view of these difficulties, various automated tools exist for populating and maintaining neighbor lists. However, even with such automated tools, current CDMA networks often contain errors in their neighbor lists.

One possible error in a neighbor list is identification of a pilot signal associated with a sector that is not actually a neighbor. Such listing may have some impact on network performance, as it may result in the mobile stations spending time searching for a pilot signal that does not exist. While undesirable, the identification of a pilot signal that is not actually a neighbor is a relatively minor problem.

The more significant problem arises when a pilot signal that is present in a sector, and therefore should be identified on the sector's neighbor list, is omitted from the neighbor list. If a pilot signal is not identified on a current neighbor list of the mobile station, then the sector associated with that pilot signal is not a handoff candidate, and the mobile station cannot engage in communication over the traffic channel of that sector. Due to the nature of CDMA communications, the signals from the non-identified sector interfere with the downlink signals to the mobile station. Further, the signals from the mobile station interfere with the uplink signals in the non-identified sector. This interference results in reduced network capacity. In severe cases, where the unidentified pilot signal is very strong, this interference may result in dropped calls.

BRIEF SUMMARY OF THE INVENTION

As described above, a problem occurs in the prior art when a network controller receives a pilot signal identification from a mobile station, where the received pilot signal identification is not present on a neighbor list of the mobile station. In accordance with an embodiment of the invention, in response to a determination that the received pilot signal identification is not present in a current neighbor list of the mobile station, the network controller identifies one of a plurality of sectors associated with the missing pilot signal identification that is a most likely handoff candidate. In one embodiment, the most likely handoff candidate is determined as the sector that is closest to the mobile station. When the most likely candidate is identified, a handoff may be initiated between the mobile station and the identified sector. The handoff may be accomplished by activating a traffic channel for the mobile station on the identified sectors.

These and other advantages of the invention will be apparent to those of ordinary skill in the art by reference to the following detailed description and the accompanying drawings.

BRIEF DESCRIPTION OF THE DRAWINGS

FIG. 5 shows portions of an example cell/sector location table;

DETAILED DESCRIPTION

In accordance with an aspect of the invention, when a mobile terminal detects a pilot signal that is not in any of its neighbor lists, the system activates a traffic channel in the sector associated with the pilot signal that is the most likely candidate for a handoff. In one embodiment, the sector associated with the pilot signal and closest to the mobile terminal is identified as the most likely candidate. In other embodiments, the sector antenna angle (azimuth) and gain pattern information may be used to determine the most likely candidate, in addition to the distances. Full propagation predictions, which include terrain elevation, clutter morphology and other parameters, in addition to distances and sector antenna information, could also be used, as available from various prediction tools for RF propagation.

Figure 1:
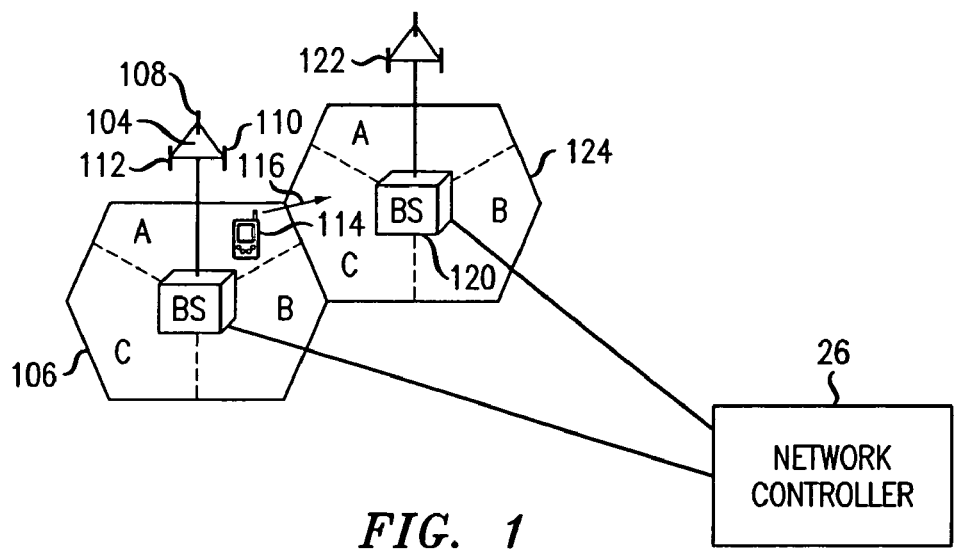
FIG. 1 shows a representation of a portion of a CDMA wireless network.
Figure 2:
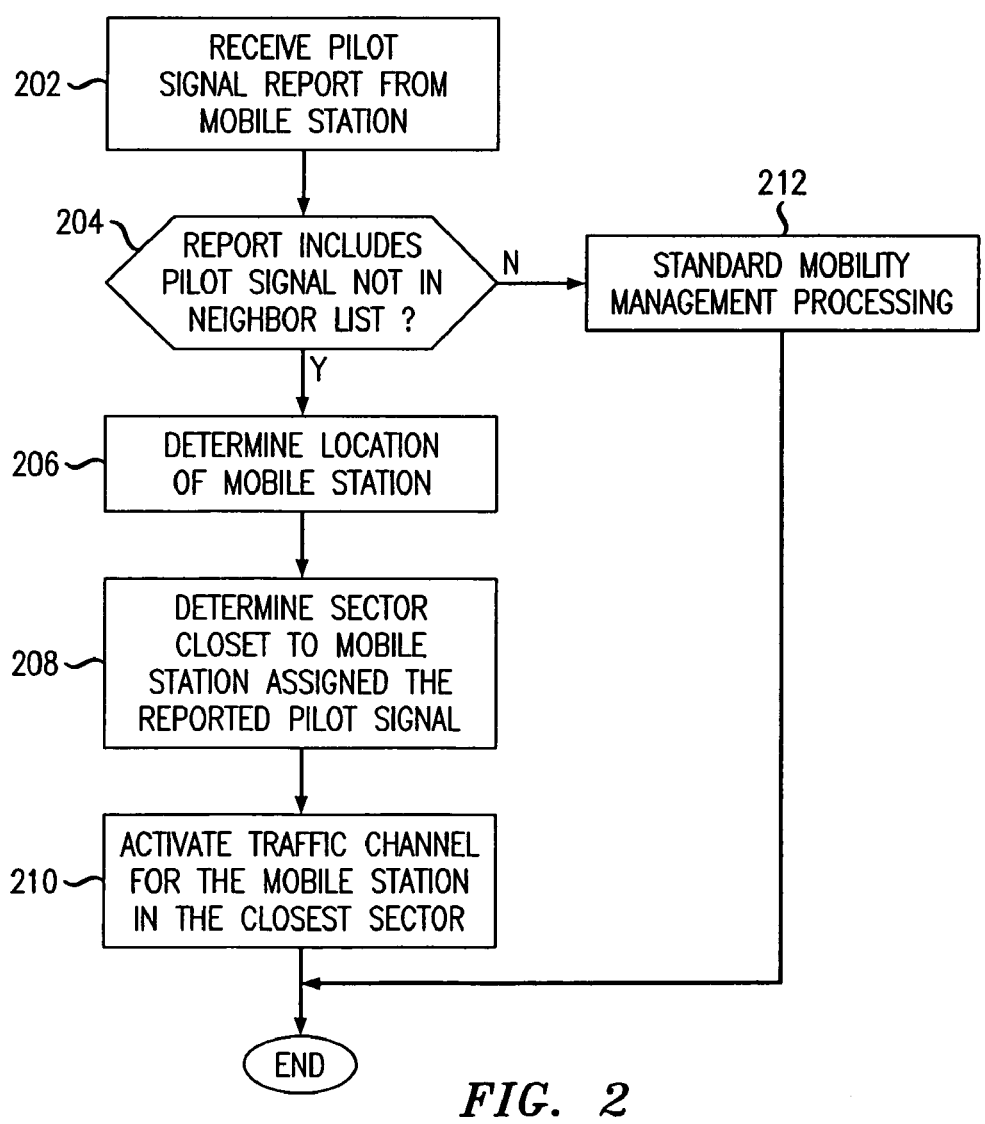
FIG. 2 is a flowchart showing the steps performed by a CDMA network controller in accordance with an embodiment of the invention.

FIG. 2 is a flowchart showing the steps performed by a CDMA network controller, for example network controller 26 of FIG. 1, in accordance with one embodiment of the invention. First, in step 202, the network controller receives a pilot signal report from a CDMA mobile station, for example a mobile telephone. As described above, during operation, a mobile station will report detected pilot signals to the network controller. More particularly, the searcher element of the mobile station continuously checks for the appearance of any new sufficiently strong pilot signals, or the disappearance (or weakening) of previously detected pilot signals. The mobile station informs the network controller of these events via a message. In an IS-95/IS2000 compliant wireless network, these messages are called Pilot Measurement Strength Messages (PSMM). In 1xEV networks conforming to the IS-856 standard, these messages are called Route Update Messages (RUM).

In step 204, the network controller determines whether the received message includes a pilot signal not in any of the neighbor lists associated with the mobile station. As described above, a neighbor list contains an identification (i.e., PN offset) of the pilot signals in the neighboring sectors that mobile stations are likely to detect while communicating within a particular sector. The neighbor list also identifies the particular sector and cell associated with each of its identified pilot signals.

If the network controller determines that the report did not include any pilot signal not in the mobile station's neighbor list, then standard mobility management processing takes place in step 212 and the processing ends in step 214. However, if the network controller determines that the report did include a pilot signal not in the mobile station's neighbor list, then processing continues in accordance with an embodiment of the invention as shown in steps 206-210.

In step 206, the network controller determines the location of the mobile station. This determination may be made in several ways, and is discussed in further detail below. In step 208, a determination is made as to which sector, that is assigned the reported missing pilot signal, is closest to the location of the mobile station. Again, this determination may be made in various ways, and is discussed in further detail below. In step 210, a traffic channel is allocated for the mobile station in the sector that was identified in step 208 (i.e., the sector closest to the mobile station and also associated with the missing reported pilot signal). This method solves the problem described above wherein a pilot signal that should have been included in a neighbor list is omitted.

The method of FIG. 2, along with a specific operational example, is further described as follows in conjunction with FIGS. 3-6.

Figure 3:
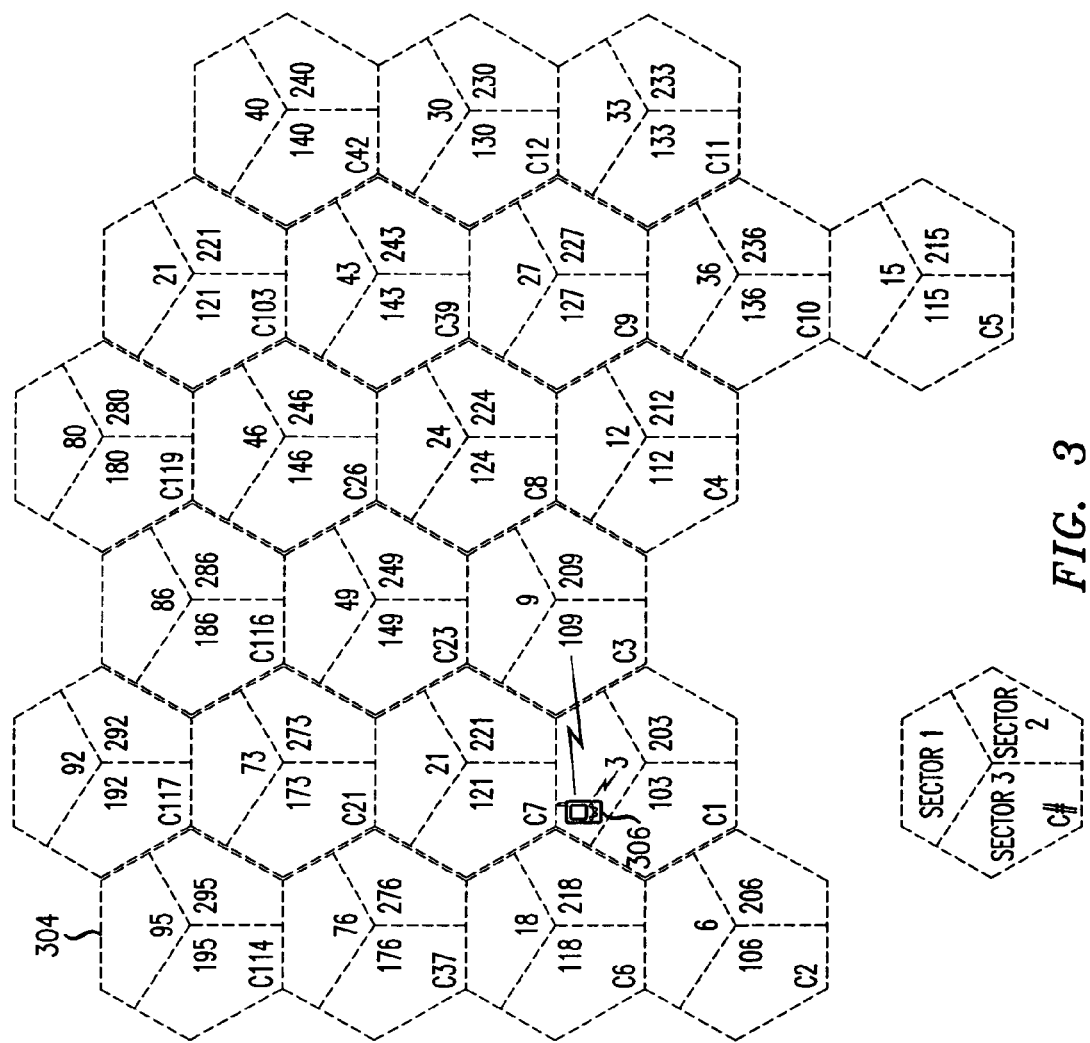
FIG. 3 shows a graphical representation of a geographic area being served by a CDMA wireless network.

FIG. 3 shows a graphical representation of a geographic area being served by a CDMA wireless network. As is conventional, the cells of the wireless network are represented by multiple hexagons. Hexagon 302 is used to explain the labeling of the various cells in the network, and is not intended to actually represent any of the cells in the actual network. Each of the cells is labeled with a cell identifier in the lower left corner preceded by the letter "c". Thus, a label of C10 represents a cell having identifier C10. Each of the cells is divided into 3 sectors, as shown by hexagon 302. In the hexagons of FIG. 3 actually representing cells (i.e., the hexagons other than hexagon 302), the numbers shown in the various sectors are pilot signal identifiers (i.e., PN offsets). Thus, for example, cell C114 (represented by hexagon 304) transmits pilot signal 95 in sector 1, pilot signal 295 in sector 2 and pilot signal 195 in sector 3.

Figure 4:
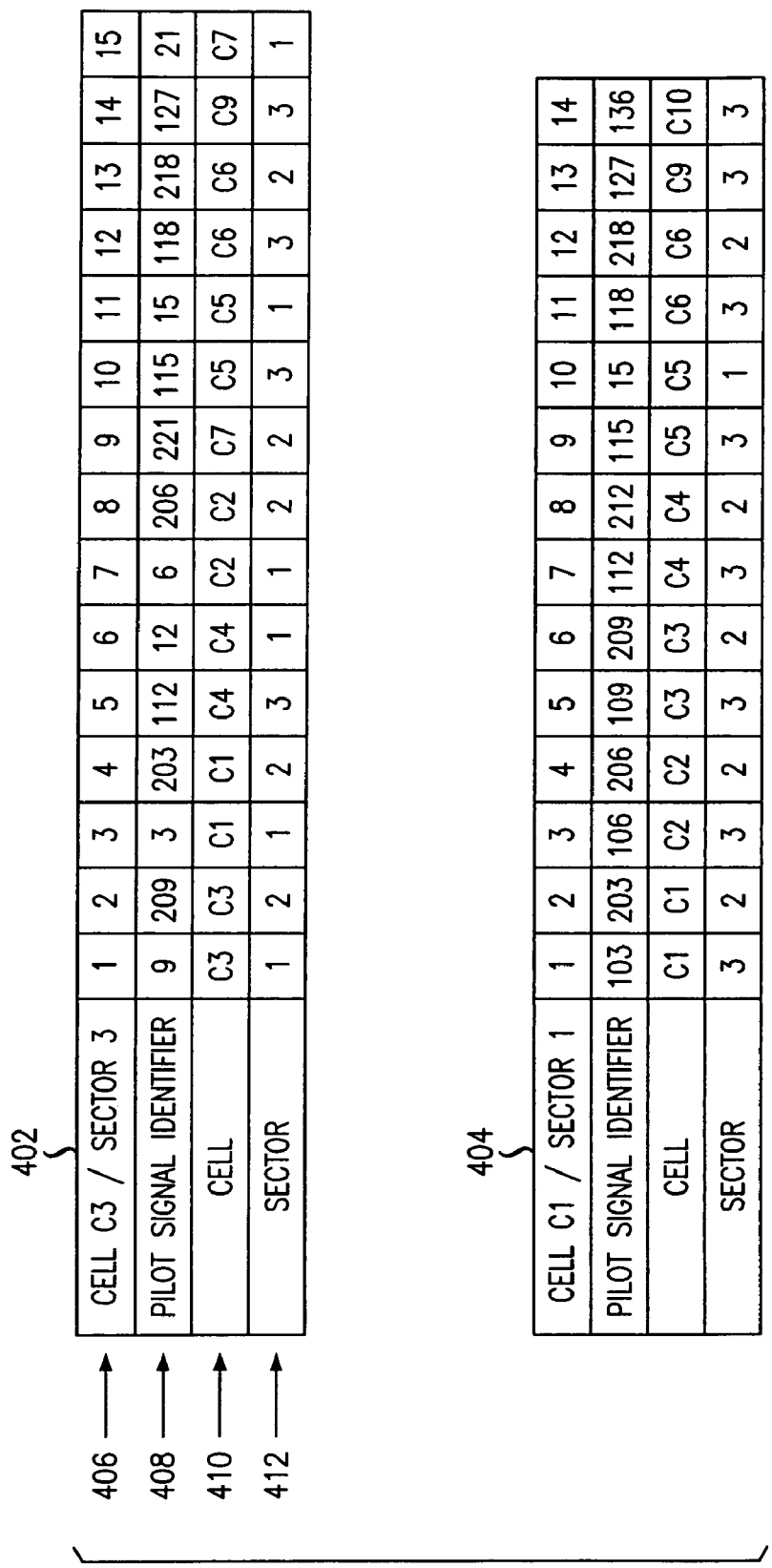
FIG. 4 shows example neighbor lists.

Continuing now with an example, consider a mobile station 306 operating within the wireless network shown in FIG. 3. Mobile station 306 is currently operating in cell C1, but is moving in a direction towards cell C7. Mobile station 306 is also currently in a soft handoff condition with sector 1 of cell C1 (having pilot signal identifier 3) and sector 3 of cell C3 (having pilot signal identifier 109). Since mobile station 306 is communicating with sector 1 of cell C1 and sector 3 of cell C3, the mobile station 306 will also have stored in memory the neighbor lists for sector 1 of cell C1 and sector 3 of cell C3. The network controller will also have information of these neighbor lists. These neighbor lists are shown in FIG. 4. 402 is the neighbor list for sector 3 of cell C3, and 404 is the neighbor list for sector 1 of cell C1. As shown in FIG. 4, neighbor list 402 contains 15 entries, labeled 1-15 in row 406. Each entry identifies a neighbor by pilot signal identifier (row 408), cell (row 410) and sector (row 412). For example, entry 6 identifies that sector 1 of cell C4 is a neighbor, and that sector is associated with pilot signal identifier 12. Neighbor list 404 shows the same information for sector 1 of cell C1.

Continuing with the example of operation, consider mobile station 306 operating as described above and receiving an increasingly strong signal associated with pilot signal identifier 121. In step 202 the network controller will receive a signal report from mobile station 306. This signal report will indicate that mobile station 306 is receiving a strong pilot signal for pilot signal identifier 121. However, with reference to the neighbor lists of FIG. 4, it can be seen that pilot signal identifier 121 is not identified in either of the neighbor lists for the mobile station 306. Thus, the test in step 204 will be yes, and processing will continue with step 206.

In step 206, the location of the mobile station 306 is determined. The location of the mobile station 306 may be determined in various ways. In one embodiment, the mobile station 306 may be equipped with a global navigation satellite signal (e.g., global positioning system (GPS)) receiver. Such receivers are well known in the art and are used to determine a location of a mobile station using signals received from orbiting earth satellites. Upon location determination, the mobile station 306 could report its location back to the network controller.

In another embodiment, the location of the mobile terminal may be determined based on the timing delays (corresponding to the RF propagation delays) of pilot signals (either reported by the mobiles in the handoff messages, or measured by the base stations themselves, or both). In accordance with this technique, the timing delay between transmission and receipt of pilot signals between the mobile station and the base stations is calculated. This delay is representative of the distance between the mobile station and each of the base stations. If at least three such distances are determined, then the location of the mobile station relative to the base stations may be determined using well known triangulation techniques. For example, U.S. Pat. No. 5,646,632 discloses a technique for use in a code division multiple access (CDMA) system in which a mobile station can identify its own location using time delays of pilot signals received from nearby base stations.

In another embodiment, the system could use the locations of the base stations with which the mobile station has an active voice channel as a basis for an estimate of mobile station location. For example, as shown in FIG. 3, mobile station 306 is in a soft-handoff condition (and has an active voice channel) with the base stations (not shown) in cells C1 and C3. Since the system knows the location of all of its base stations (as described in further detail below), the location of the mobile station 306 could be estimated as a mid-point between these active base stations. Various weighting factors could be applied to one or more of the active base stations depending upon the signal strength of the pilot signals received from these base stations at the mobile station.

As yet another alternative, the location of the mobile station could be estimated as the location of the base station having the strongest pilot signal strength as received by the mobile station.

As described above, there are various techniques available for determining the location of the mobile station. The present invention is not limited to any particular technique. Any technique for determining or estimating the location of the mobile station may be used.

Next, in step 208, the sector closest to the location of the mobile station, and associated with the reported missing pilot signal, is identified. In one embodiment of the invention, the network controller stores a table listing the location of each of the network base stations. Although the base stations are not shown in FIG. 3, each cell is served by a generally centralized base station within the cell. Such a configuration is shown in FIG. 1, for example with base station 102 located centrally within cell 106 and providing service to sectors A, B and C. FIG. 5 shows portions of a cell/sector location table 502 that identifies the location of each sector by a latitude and longitude value. For example, entry 504 of the table indicates that sector 1 of cell C3 has an associated PN offset of 9 and is located at a latitude of Xxxxxxxx3 and a longitude of Yyyyyyyy3. Of course, the latitudes and longitudes shown in FIG. 5 are not actual values, but only labels used to represent actual values that would be present in an actual implementation. Also, FIG. 5 only shows portions of the cell/sector location table. Step 208 compares the location of the mobile station 306 as determined in step 206 to the cell/sector location table 502 in order to determine the sector that is associated with the reported pilot signal and that is closest to the mobile station 306.

Figures 6, 7:
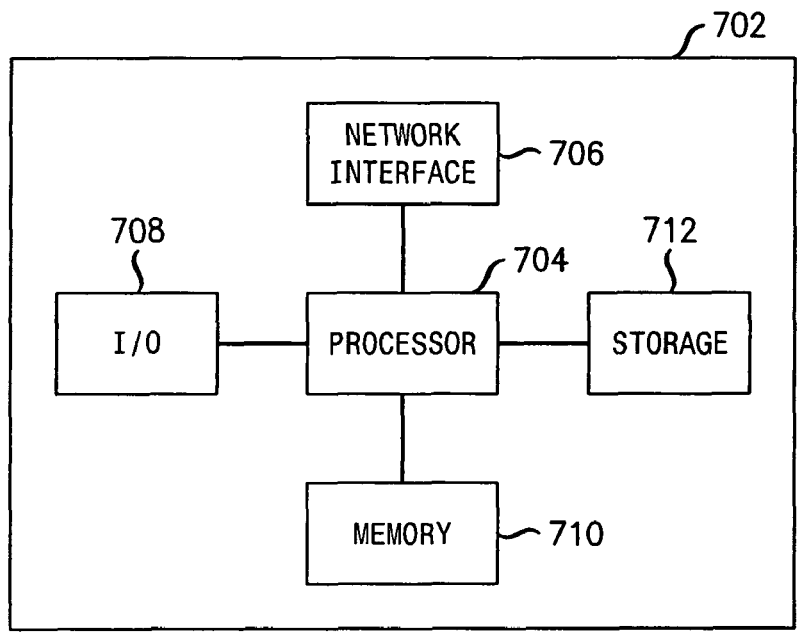
FIG. 6 represents the calculation of the distances of sectors to a mobile station.
FIG. 7 shows a high level block diagram of a computer.

First, all sectors that are associated with the missing reported pilot signal (PN Offset 121 in the present example) are identified. As shown in FIG. 5, the sectors associated with PN offset of 121 are cell C7/sector 3 having a latitude/longitude of Xxxxxxxx7/Yyyyyyyy7; cell C103/sector 3 having a latitude/longitude of Xxxxxxxx103/Yyyyyyyy103; and cell C217/sector 3 having a latitude/longitude of Xxxxxxxx217/Yyyyyyyy217. A graphical example of the determination of step 208 is shown in the table of FIG. 6. FIG. 6 represents the calculation of the distance of each of the identified sectors to the mobile station. As shown in FIG. 6, cell C7/sector 3 has a distance of 1.46 miles to the mobile station 306, cell C103/sector 3 has a distance of 7.53 miles to the mobile station 306, and cell C217/sector 3 has a distance of 19.4 miles to the mobile station 306. Thus, in accordance with this example, step 208 will identify sector 3 of cell C7 as the sector closest to the mobile station and being associated with the missing pilot signal.

In step 210, the network controller will activate a traffic channel for the mobile station 306 in sector 3 of cell C7. A soft handoff, as is well known in the art, will then proceed in a conventional manner, using the new traffic channel in sector 3 of cell C7.

The technique described above solves the problem of a mobile station reporting a pilot signal that is not present in the mobile station's neighbor lists. Using the techniques described above, the mobile station can initiate communication with a sector associated with a reported pilot signal, even if that pilot signal is not present on the mobile stations neighbor lists, thus solving the problems of the prior art as described above.

The network controller 26 shown in FIG. 1 may be implemented as a computer as is well known in the art. Network controller 26 may be implemented, for example, using well known computer processors, memory units, storage devices, computer software, and other components. A high level block diagram of such a computer is shown in FIG. 7. Computer 702 contains a processor 704 which controls the overall operation of computer 702 by executing computer program instructions which define such operation. The computer program instructions may be stored in a storage device 712 (e.g., magnetic disk) and loaded into memory 710 when execution of the computer program instructions is desired. Thus, the network controller application will be defined by computer program instructions stored in a computer readable medium (e.g., memory 710 and/or storage 712) and the network controller application will be controlled by processor 704 executing the computer program instructions. Computer 702 also includes one or more network interfaces 706 for communicating with other devices via a network. Computer 702 also includes input/output 708 which represents devices which allow for user interaction with the computer 702 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes. One skilled in the art will also recognize that the various functions of the network controller can be implemented in hardware, software, and various combinations of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for operation of a wireless network node that is in communication with a mobile station, the method comprising the steps of:
   receiving, at the wireless network node, a pilot signal identification from said mobile station;
   in response to a determination that said pilot signal identification is not present in a current neighbor list of said mobile station, identifying, at the wireless network node, one of a plurality of sectors that is a most likely handoff candidate, wherein each of the plurality of sectors uses the same pilot signal identification.

2. The method of claim 1 wherein said step of identifying comprises:
   determining which of said plurality of sectors is closest to said mobile station.

3. The method of claim 1 further comprising the step of:
   initiating a handoff of said mobile station to said identified one of a plurality of sectors.

4. The method of claim 1 further comprising the step of:
   activating a traffic channel for said mobile station in said identified one of a plurality of sectors.

5. A method for operation of a wireless network node that is in communication with a mobile station, the method comprising the steps of:
   receiving, at the wireless network node, a pilot signal identification from said mobile station;
   in response to a determination that said pilot signal identification is not present in a current neighbor list of said mobile station, identifying, at the wireless network node, one of a plurality of sectors that is closest to said mobile station, wherein each of the plurality of sectors uses the same pilot signal identification.

6. The method of claim 5 further comprising the step of:
   initiating a handoff of said mobile station to said identified one of a plurality of sectors.

7. The method of claim 5 further comprising the step of:
   activating a traffic channel for said mobile station in said identified one of a plurality of sectors.

8. A wireless network node configured to communicate with a mobile station, said wireless network node comprising:
   means for receiving, at the wireless network node, a pilot signal identification from said mobile station;
   means for determining, at the wireless network node, that said pilot signal identification is not present in a current neighbor list of said mobile station; and
   means, responsive to said step of determining, for identifying, at the wireless network node, one of a plurality of sectors that is a most likely handoff candidate, wherein each of the plurality of sectors uses the same pilot signal identification.

9. The wireless network node of claim 8 wherein said means for identifying comprises:
   means for determining which of said plurality of sectors is closest to said mobile station.

10. The wireless network node of claim 8 further comprising:
    means for initiating a handoff of said mobile station to said identified one of a plurality of sectors.

11. The wireless network node of claim 8 further comprising:
    means for activating a traffic channel for said mobile station in said identified one of a plurality of sectors.

12. A computer readable medium storing computer program instructions for controlling the operation of a wireless network node configured to communicate with a mobile station, said computer program instructions defining the steps comprising:
    receiving, at the wireless network node, a pilot signal identification from said mobile station;
    in response to a determination that said pilot signal identification is not present in a current neighbor list of said mobile station, identifying, at the wireless network node, one of a plurality of sectors that is a most likely handoff candidate, wherein each of the plurality of sectors uses the same pilot signal identification.

13. The compute readable medium of claim 12 wherein said step of identifying comprises:
    determining which of said plurality of sectors is closest to said mobile station.

14. The computer readable medium of claim 12 further storing computer program instructions defining the step comprising:

initiating a handoff of said mobile station to said identified one of a plurality of sectors.

15. The computer readable medium of claim 12 further storing computer program instructions defining the step comprising:

activating a traffic channel for said mobile station in said identified one of a plurality of sectors.

* * * * *